United States Patent [19]

Grace

[11] Patent Number: 4,621,745

[45] Date of Patent: Nov. 11, 1986

[54] MECHANIZED CARTON PICKER

[76] Inventor: Robert W. Grace, P.O. Box 666, Sandusky, Ohio 44870

[21] Appl. No.: 664,337

[22] Filed: Oct. 24, 1984

[51] Int. Cl.$^4$ ............................................. B65G 13/00
[52] U.S. Cl. ........................................ 221/75; 193/40; 312/42; 414/276; 414/285
[58] Field of Search ....................... 414/267, 276, 285; 193/27, 38, 40; 211/1.5, 59.2; 312/42; 221/75

[56] References Cited

U.S. PATENT DOCUMENTS

| 342,433 | 5/1886 | Fischer | 193/27 |
| 1,034,618 | 8/1912 | Holcombe | 193/27 |
| 4,485,910 | 12/1984 | Tabler | 414/286 X |

FOREIGN PATENT DOCUMENTS

| 1045134 | 11/1958 | Fed. Rep. of Germany | 221/90 |
| 1044183 | 9/1966 | United Kingdom | 193/27 |
| 521191 | 9/1976 | U.S.S.R. | 193/35 R |

OTHER PUBLICATIONS

Allan Harvey, "Automatic Routing and Dispatching to Trucks and Trailers", Flow Magazine, May 1956, pp. 110 and 142.

*Primary Examiner*—Leslie J. Paperner
*Assistant Examiner*—Ken Muncy
*Attorney, Agent, or Firm*—Pearne, Gordon, Sessions, McCoy, Granger & Tilberry

[57] ABSTRACT

A vertically accumulating storage and dispensing apparatus for containers and the like wherein the containers are loaded at the top of a tower and selectively dispensed from the bottom. The tower has a frame that defines first and second tower sections, each supporting a number of vertically spaced shelf trays which in turn support the containers which are stacked on the trays when loaded. The shelf trays of each tower section face inwardly toward and are staggered relative to each other. Each tray is mounted for pivotal movement about a horizontal axis and is operated so that when a container is dispensed from a bottom shelf tray, each higher tray beginning at the bottom and progressing upward one at a time, pivots to transfer its carton to the upwardly tilted next lower empty shelf tray. This process is repeated until each container has been transferred to the next lower shelf tray. As a container is loaded at the top of the tower, the shelf trays are operated to pass the container downwardly in zig zag fashion from one tray to another until it reaches the highest unloaded shelf tray.

14 Claims, 7 Drawing Figures

MECHANIZED CARTON PICKER

BACKGROUND OF THE INVENTION

This invention relates to automated storage and retrieval systems for central warehousing operations that serve large retailing chains and especially to material handling equipment for use in such facilities. More particularly, the invention relates to an automatic storage and handling apparatus for containerized goods, especially cartons, that are loaded to capacity at the top from a conveyor to form a vertical stack and that are unloaded from below upon command by a signal from a central control system.

In recent years, warehousing depots such as for grocery chains and other retail store chains have become more centralized and at the same time larger and more complex. As a result, systems for automating the storage and distribution operations have been developed in an attempt to utilize computerized control systems both for inventory management and for distribution to retail outlets and the like.

In a typical storage and distribution system, containerized consumer goods (i.e. paper products, cleaning preparations, packaged food products, etc. in cartons) are delivered to the warehousing facility from the manufacturer, on pallets. A standard Grocery Manufacturer's Association (G.M.A.) pallet, for example, has dimensions of forty inches by forty-eight inches and may contain forty to eighty cartons. From the receiving dock, where pallets are unloaded from trucks or rail cars, the pallets are frequently transported to a vertical array of racks. When the cartons are selected for redistribution to a retail outlet, a worker extracts cartons from a rack and places them on a conveyor which delivers them to a distribution dock for loading on trucks.

This system is cumbersome and inefficient and requires expensive labor in the extracting of designated cartons for further distribution. The apparatus of the present invention eliminates the manual portion of this operation and affords other features and advantages heretofore not obtainable.

SUMMARY OF THE INVENTION

It is among the objects of the invention to improve the efficiency of centralized storage and retrieval systems and especially with respect to warehousing facilities for containerized goods that are eventually distributed to retail outlets or the like.

Another object is to provide an apparatus for storing containerized goods in vertical stacks in such a way that they are successively advanced from a loading station to an unloading station automatically by gravity alone without the use of a powered operating mechanism.

These and other objects and advantages are obtained using the novel vertical storage and dispensing apparatus of the invention which includes a relatively high tower formed by two interconnected sections adjacent one another. The articles to be stored and dispensed are loaded at the top and moved downwardly automatically in zig zag fashion seriatim by gravity alone from one section of the tower to the other.

Each section of the tower has a number of transfer shelves, each of which is supported for pivotal movement about a horizontal axis. The shelves of one section are staggered relative to the shelves of the other section. Each of the shelves is pivotable about its respective axis between an upwardly tilted, carton receiving position, a generally horizontal storage position and a downwardly tilted container-transferring position. The shelves are continuously urged to the upwardly tilted position by resilient means such as a torsion spring. When one of the shelves is tilted downwardly to its transfer position, the next lower adjacent shelf in the adjacent tower section remains in its upwardly tilted position until the container completes its sliding transfer movement. At this time a latch is released so that the weight of the container causes the receiving shelf to pivot downwardly to its horizontal storage position. The container and shelf remain in this position until the next lower shelf is empty so that it pivots to its upwardly tilted position. The upward movement of the next lower shelf causes the loaded shelf to be released from its horizontal position so that the weight of the carton pivots the respective shelf downwardly to its transfer position and the carton slides to the next lower empty shelf.

With this arrangement, an article delivered to the highest transfer shelf in the tower at the loading station moves downwardly back and forth alternately between a shelf of one tower section to the next empty lower shelf of the other tower section until it is stored at the lowest available shelf. In this way the tower accumulates a quantity of cartons which may be removed therefrom at the unloading station at the bottom upon receipt of a signal from a central control station.

The tower thus described operates in the following way: Cartons supplied at the top of the tower will automatically progress downwardly from shelf to shelf in zig zag fashion, seriatim until the shelves are loaded from the bottom up depending upon the number of cartons that have been supplied at the top. Also, as a carton is removed from the bottom shelf all of the cartons stored in the tower will move downwardly seriatim beginning at the bottom, all of which is accomplished automatically by the force of gravity alone without need for power equipment and without damage to the cartons.

DESCRIPTION OF THE PREFERRED EMBODIMENT

Figure 1:
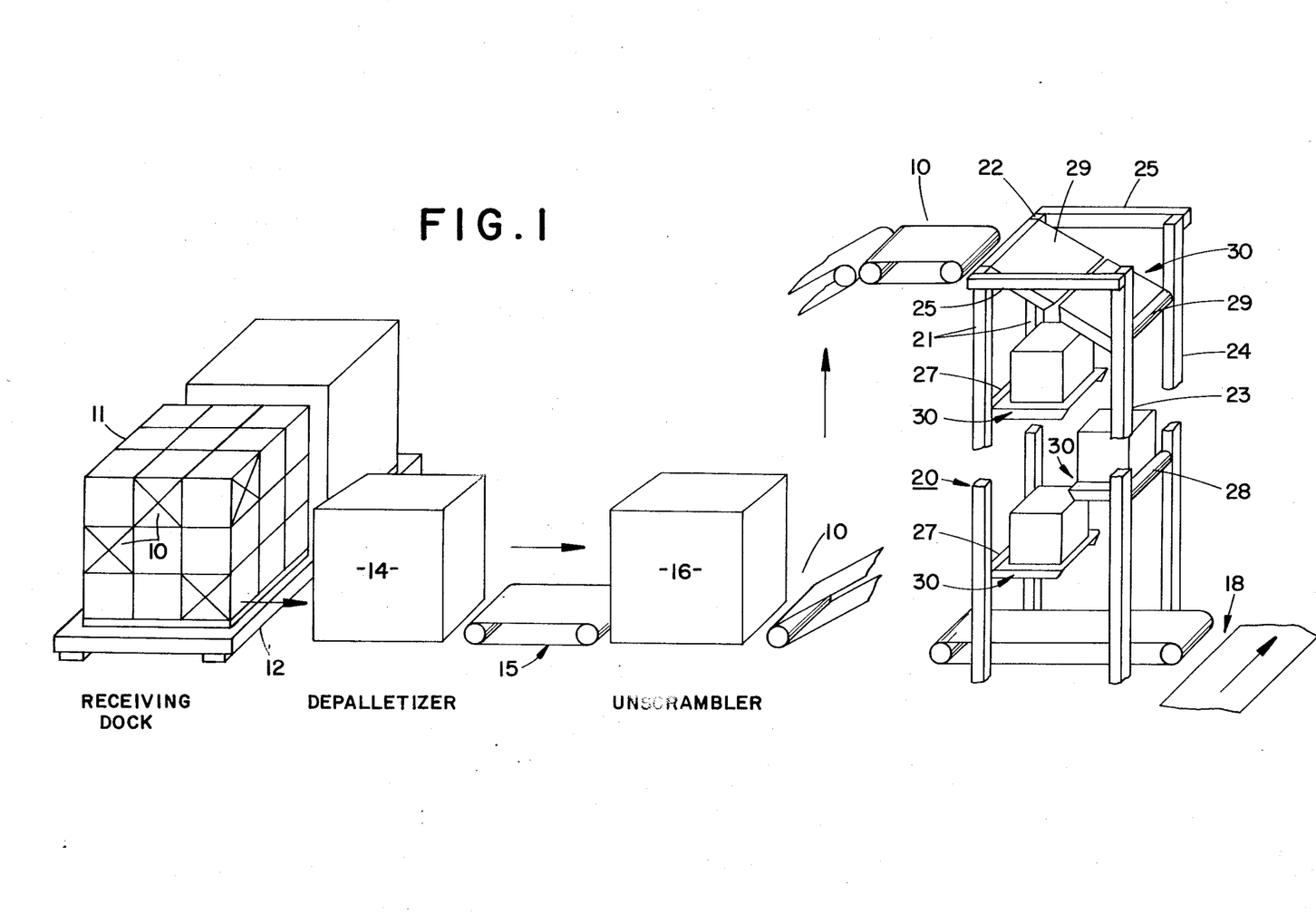
FIG. 1 is a schematic diagram illustrating a typical carton storage and retrieval facility in which a vertical storage and dispensing tower embodying the invention is utilized.

The mechanized storage and retrieval tower of the invention is adapted for use in an automated storage and retrieval system which, for the purpose of illustration, will be described herein in connection with a large warehousing facility adapted for storage and distribution of containerized goods. The general organization of the system is illustrated in FIG. 1 wherein cartons 10 of a specific type (i.e. with specific contents therein) are among many different types of cartons that are received, stored and distributed. The goods are initially received in the form of palletized loads 11 which include a number of the cartons 10. A standard G.M.A. pallet may contain from forty to sixty cartons and weigh up to three thousand pounds. The palletized loads are unloaded from a truck or rail car onto a receiving dock 12. From the receiving dock 12 the pallets are conveyed to a depalletizer 14 which disassembles the pallets and distributes the individual cartons to a conveyor 15. The conveyor 15 transports the individual cartons to an unscrambler 16 which adjusts the cartons to a uniform orientation on a conveyor.

From the unscrambler 16 the cartons 10 are transported to a carton storage and distribution tower (picking tower) 20 embodying the invention.

The cartons 10 are loaded at the top of the tower and removed from the bottom by another conveyor 18 which conveys them to a distribution dock.

Because there will no doubt be hundreds of different types of cartons (i.e. with different types of contents) in the warehousing facility, there will be a great many storage and retrieval towers 20, and probably at least two towers for each specific type of containerized goods. For the purpose of illustration, only one storage and retrieval tower will be illustrated and described herein, the tower 20 being typical of the general construction and arrangement of the others. It will be understood, however, that the towers may vary somewhat in construction and arrangement depending upon the size and weight of the cartons to be stored.

General Arrangement

The tower 20 (FIG. 2) comprises two interconnected sections located adjacent one another, the first section being supported by a pair of vertical posts 21 and 22 and the second section being supported by another pair of vertical posts 23 and 24. The two pairs of posts 21, 22, and 23, 24 are connected to one another at the top by cross members 25 and at the bottom by cross members 26. Usually additional diagonal bracing between the posts 21, 22, 23, 24 will be used to achieve the desired stability and strength.

Figure 2:
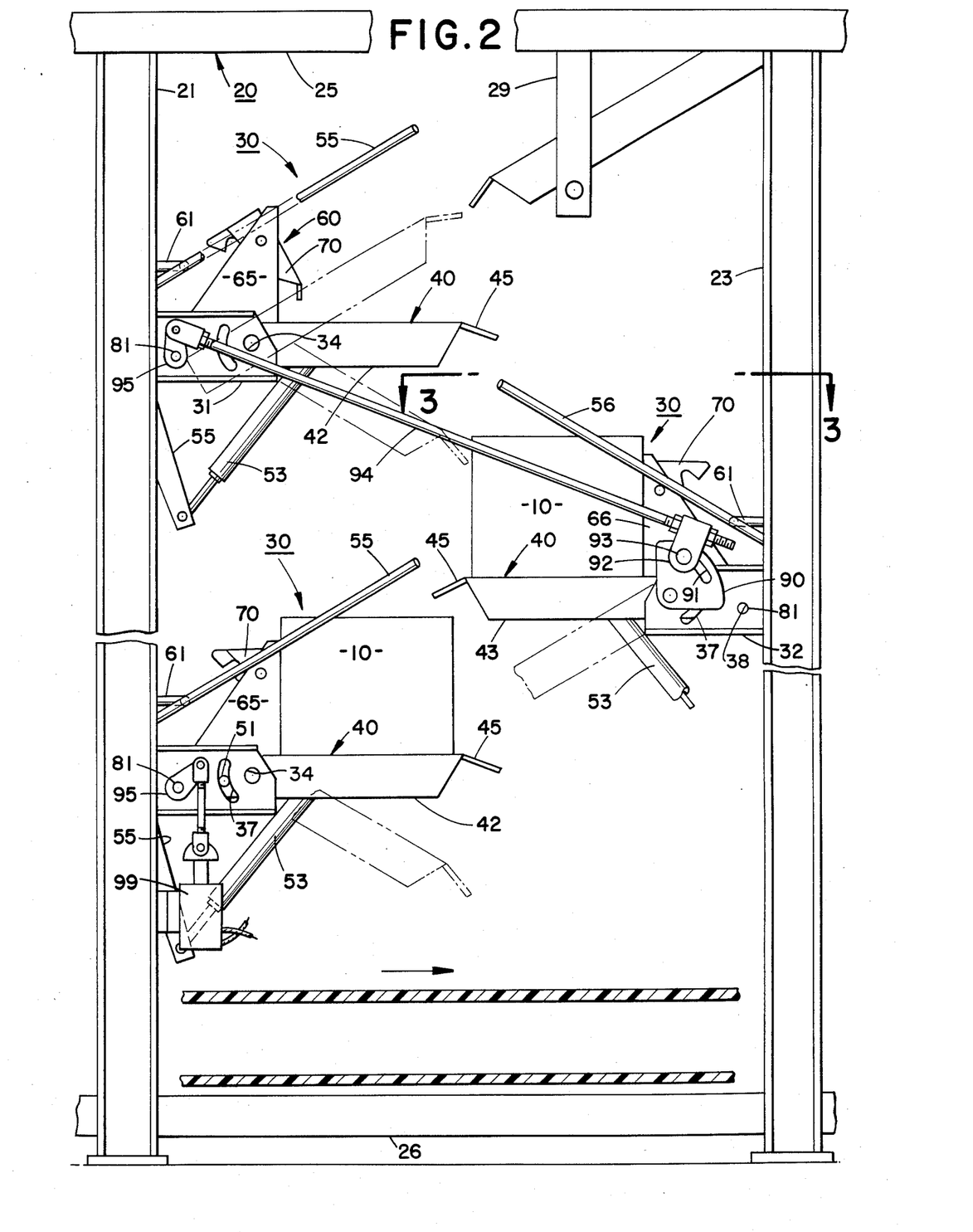
FIG. 2 is a broken elevational view illustrating a carton storage and dispensing tower embodying the invention.

The two posts of each pair are connected by a plurality of horizontal tubular mounting bars 27 and 28, the bars 27 connecting the posts 21 and 22 and the bars 28 connecting the posts 23 and 24. The bars 27 are uniformly spaced from top to bottom as are the bars 28; however, the bars 27 are staggered vertically relative to the bars 28.

Each of the bars 27 and 28 supports a movable shelf assembly 30, each assembly being adapted to support one of the cartons 10. Cartons to be supplied to the shelf assemblies 30 are loaded on the fixed top slide 29 and unloaded from the lowest shelf assembly.

Shelf Assemblies

Figure 3:
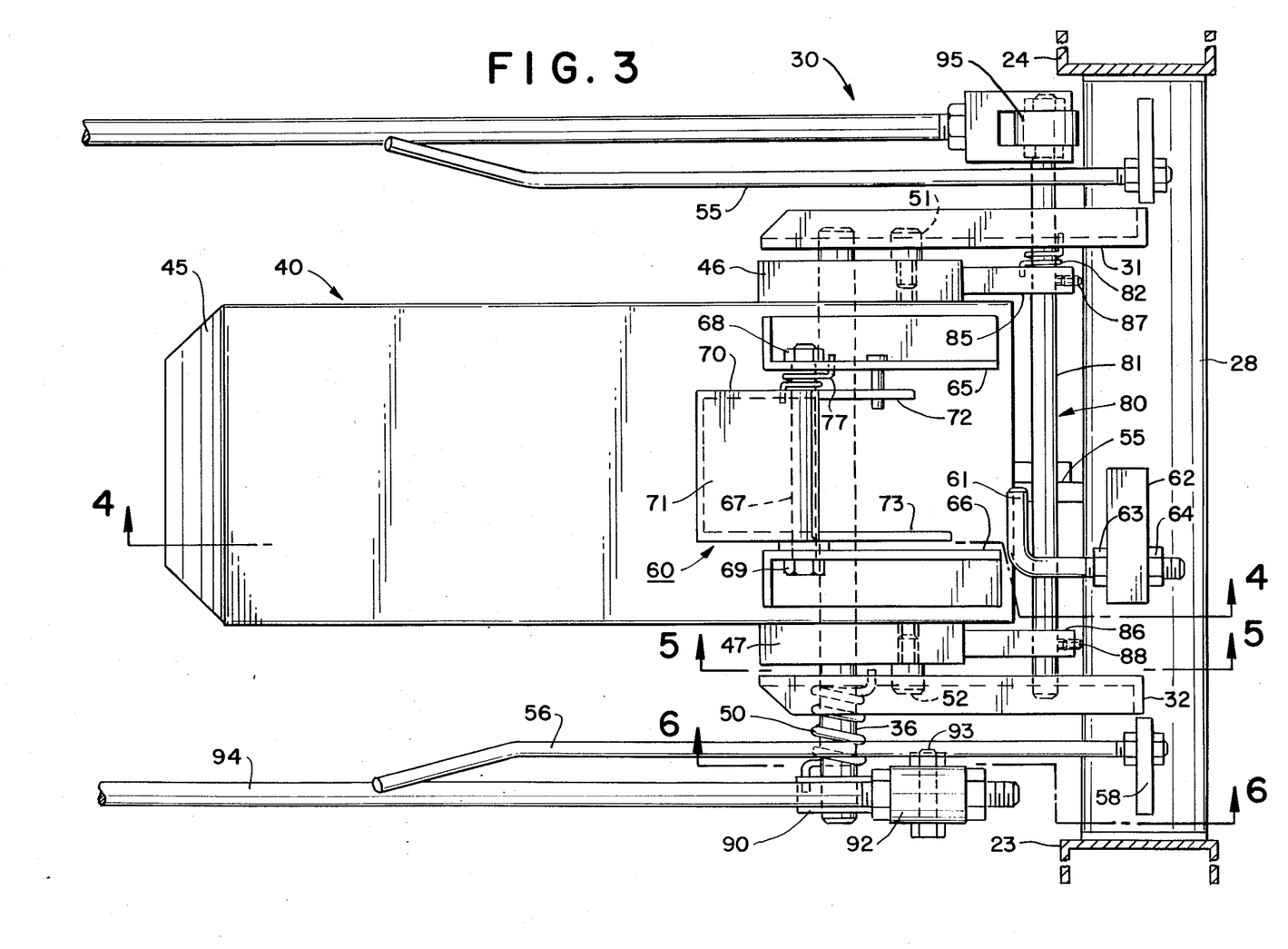
FIG. 3 is a sectional view taken on the line 3—3 of FIG. 2 illustrating one of the transfer shelves and mechanism associated therewith of the carton storage and dispensing tower of FIG. 2.

The shelf assemblies 30 include as their principal components a tray 40, a latch mechanism 60 and a tray stop mechanism 80. While there are a large number of shelf assemblies 30 (e.g. as many as 40) for each tower 20, like numerals will be used for like parts in all of the assemblies in the tower shown. Each shelf assembly 30 is supported on its respective mounting bar 27, 28, by a pair of mounting brackets 31 and 32. The brackets are welded to the respective bar. Each of the brackets has a circular opening 34, 35 that receives an axle shaft 36 on which a shelf tray 40 is mounted.

Also each bracket 31, 32 has an arcuate slot 37 that serves to define upper and lower limits of pivotal movement for the tray 40 in a manner to be described. The arc is formed about a radius centered at the axis of the axle shaft 36. Also the brackets have another pair of aligned circular openings 39 for use in association with the shelf stop mechanism 80 as will be described in detail below.

The shelf tray 40 has side flanges 42 and 43, a rear flange 44 and a slightly angled front ramp 45. A pair of axle plates 46 and 47 (FIGS. 3 and 5) are bolted to the outside of the side flanges 42 and 43 in aligned relation using bolts 48 and 49.

Figure 5:
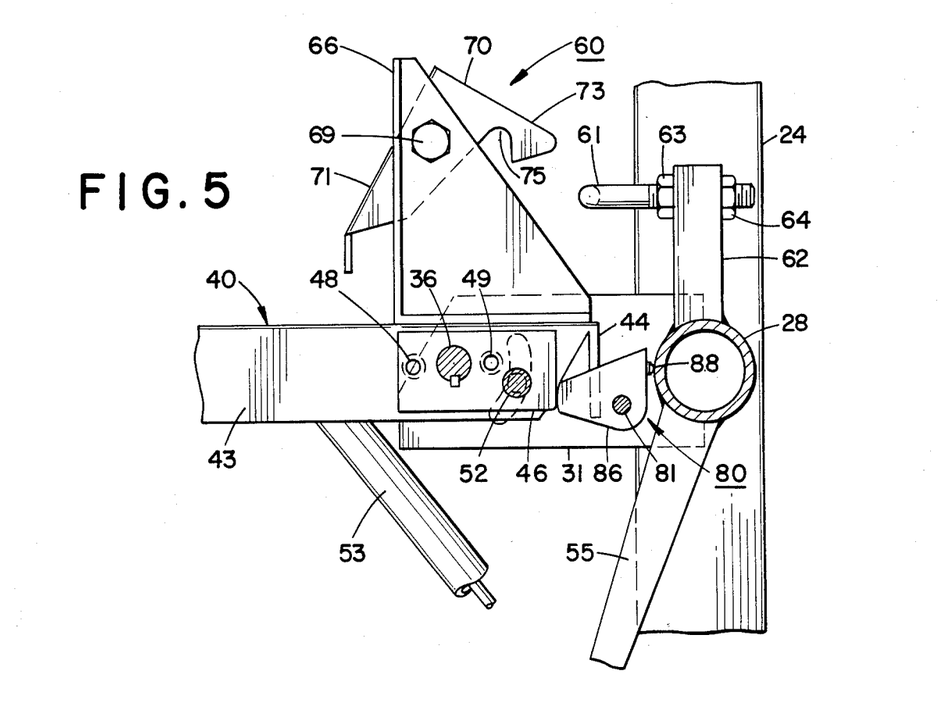
FIG. 5 is a fragmentary sectional view on a reduced scale taken on the line 5—5 of FIG. 3.

The axle shaft 36 has flats formed at its outer ends that cooperate with keys located in the axle plates 46 and 47 so that the plates (and tray) are essentially keyed to the shaft 36.

Figure 4:
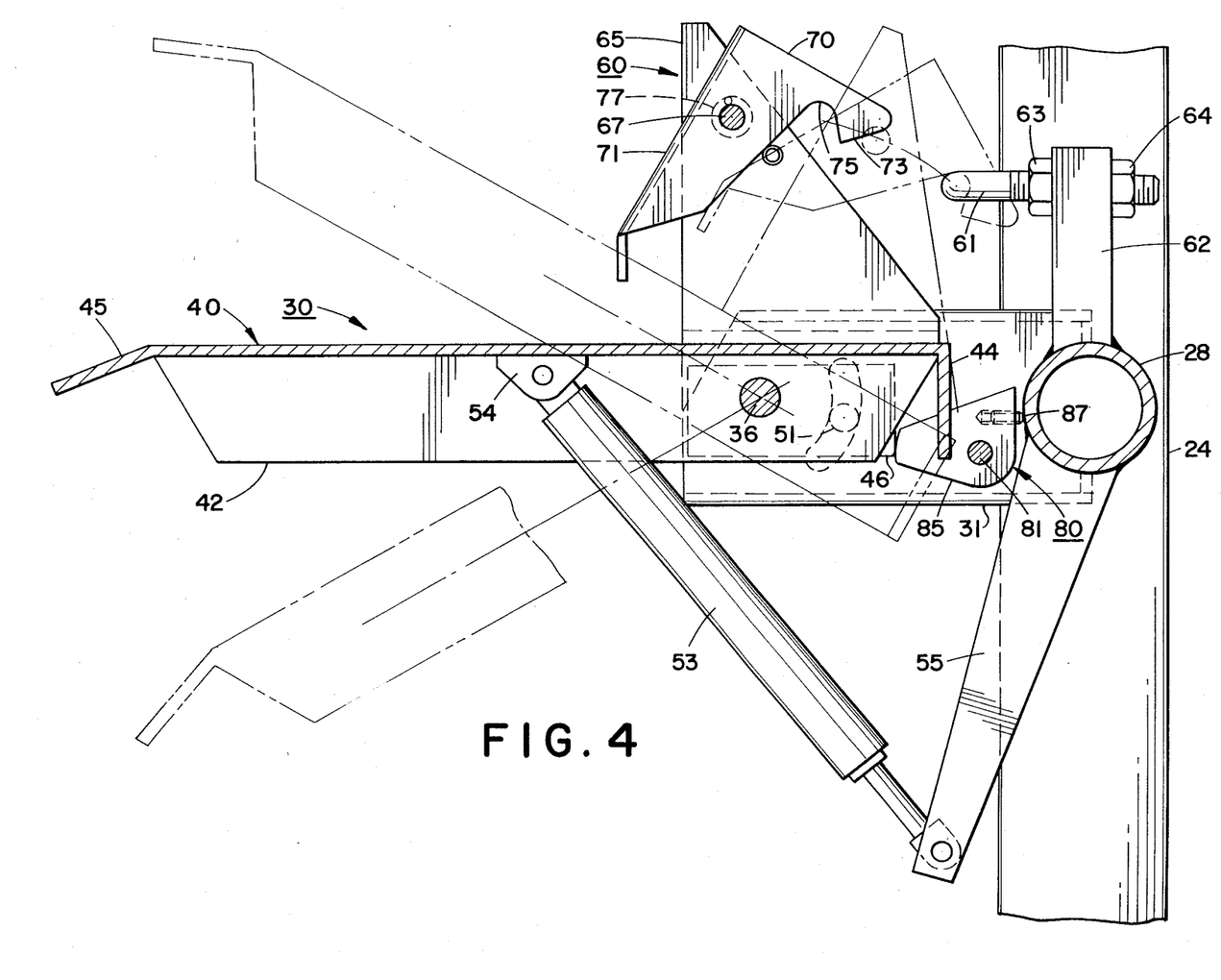
FIG. 4 is a sectional view taken on the line 4—4 of FIG. 3.

The tray 40 pivots about the axis of the shaft 36 between an upwardly tilted position (about 25°) as shown in dashed lines in FIG. 4, a horizontal position shown in solid lines in FIG. 4 and a downwardly tilted carton-transfer position (also about 25°) as shown in dashed lines in FIG. 4. The tray 40 is urged to its upwardly tilted position by a helical torsion spring 50 mounted on an outwardly extending end of the axle shaft 36 and connected at one end to the bracket 32. The other end of the spring is connected to an element 90 of the stop release mechanism forming part of the tray stop mechanism 80. This mechanism will be described in detail below.

The upper and lower limits of pivotal movement of the tray 40 are defined by means of stop pins 51 and 52 secured to the respective axle plates 46 and 47 and which extend into the respective arcuate slots 37 formed in the respective mounting brackets 31 and 32. This function is best illustrated in FIG. 4.

The rate of fall of the tray 40 from one position to the next lower position is regulated by an air cylinder 53 connected between a bracket 54 welded to the bottom of the tray 40 and a fixed support arm 55 welded to and extending angularly downward from the respective mounting bar 27, 28.

When a carton 10 slides onto the tray 40 from the next higher shelf assembly 30, the latch mechanism 60 is released, after which the weight of the carton causes the tray 40 to pivot to the horizontal position illustrated in solid lines in FIG. 4. The force exerted by the torsion spring 50 is readily overcome by the weight of the particular carton to be stored.

The tray 40 is retained in a horizontal position by the stop mechanism 80 which is only released when the next lower shelf assembly 30 is empty and has been moved by its respective torsion spring 50 to the upwardly-tilted carton-receiving position. When that occurs a release mechanism releases the tray 40 so that it can pivot downwardly to its carton-transfer position in response to the weight of the carton.

When the carton 10 is completely transferred to the next lower tray 40 the torsion spring 50 urges the empty tray 40 back to its upwardly-tilted carton-receiving position in readiness to receive a carton from the next higher shelf assembly of the opposite tower section. At the same time that the empty tray 40 reaches its upwardly-tilted carton-receiving position, its stop release mechanism releases the stop mechanism 80 of the next higher shelf assembly 30.

The tilt angle for the trays 40 as shown is 25°; however, a range of between 20° and 30° is generally effective. The angle must be sufficient that the angular component of the weight of the carton is sufficient to overcome the friction between the bottom of the carton and the surface of the tray.

The cartons usually weigh from 20 to 35 lbs; however, some may weigh up to 50 lbs. As indicated above, the shelf assemblies may be adjusted to meet the weight and size characteristics of the cartons.

The sliding transfer movement of a carton onto a particular tray 40 is guided by a pair of guide rods 55 and 56 extending upwardly at an angle of about 25°, generally parallel to the tray 40 when in its upwardly-tilted position, and on opposite sides thereof. The rods 55 and 56 are attached at their lower ends to mounting blocks 57 and 58 secured to the respective mounting bar 27 and 28. The spacing between the guide rods 55 and 56 is adjustable to accommodate cartons of different sizes.

Latch Mechanism

The latch mechanism 60 serves to hold the shelf assembly 30 in its upwardly tilted position until it has received a carton 10 from the next higher shelf assembly and the downward transfer motion of the carton has been completed. When that transfer is accomplished, the carton itself unlatches the mechanism 60.

The latch mechanism includes a fixed "L" shaped latch rod 61 supported by a mounting block 62 which is welded to the mounting bar 27 and which has a threaded opening 63. The end of the longer leg of the rod 61 is threaded into the opening 63 and held in position by a lock nut 64, which is adjusted as required.

The mechanism 60 includes a pair of upright brackets 65 and 66 fastened to the top of the tray 40 parallel to one another. The brackets support a shaft 67 that extends through openings therein and that has threaded ends that receive nuts 68 and 69 to secure it in position.

A latch plate 70 is secured to the shaft 67 for pivotal movement thereon relative to the brackets 65 and 66 and thus relative to the tray 40. The latch plate has a front face 71 and two rearwardly extending parallel end flanges 72 and 73. The end flange 73 defines a latch slot 75 adapted to move into latching engagement with the leg at the outer end of the latch rod 61.

The latch plate 70 is urged into latching engagement with the rod 61 by a torsion spring 77 located on the shaft 67. Thus, the latch plate 70 serves to lock the tray 40 in its upwardly-tilted carton-receiving position until such time as the plate is pivoted in a counterclockwise direction as viewed in FIG. 3 against the pressure of the torsion spring 77 to bring the latch slot 75 out of engagement with the latch rod 61. This pivotal release movement occurs when a forward end of a carton 10 engages the latch plate 70 to pivot it against the force of the spring 77, to the unlatching position.

Tray Stop Mechanism

Figure 6:
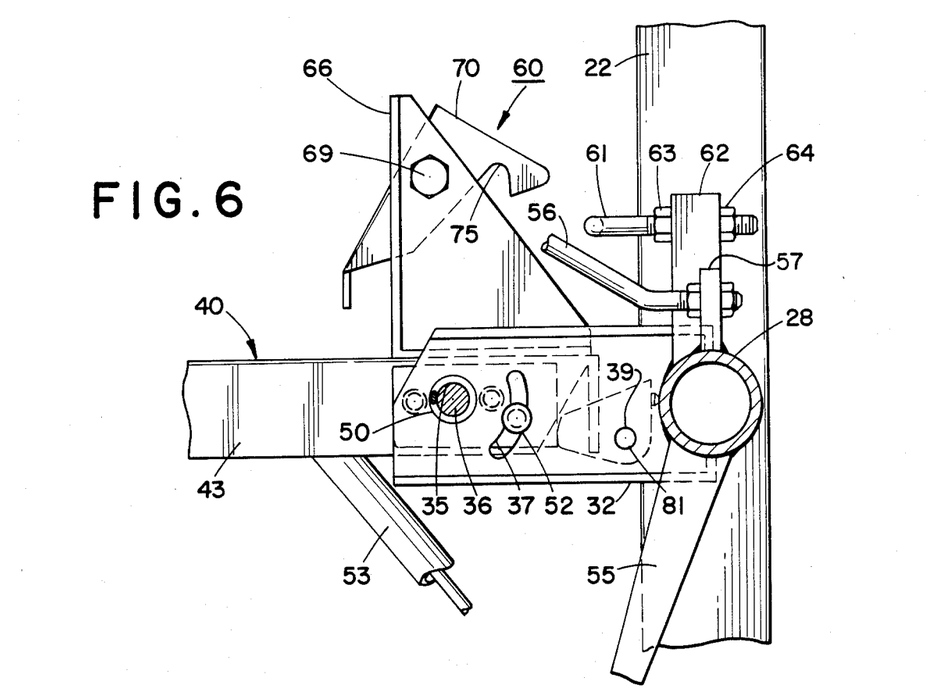
FIG. 6 is a fragmentary sectional view on a reduced scale taken on the line 6—6 of FIG. 3.

Once the shelf assembly 30, loaded with a carton 10 pivots from its upwardly-tilted carton-receiving position, downwardly to its horizontal storage position, it is positively retained in its horizontal storage position by the stop mechanism 80. The mechanism 80 includes a shaft 81 that extends through the aligned openings 38 and 39 in the mounting brackets 31 and 32 and which has keyed thereto a pair of dogs 85 and 86 which engage the respective axle plates 46 and 47 as illustrated in FIGS. 4, 5 and 6. The shaft 81 has flats formed in its outer end that are engaged by setscrews 87 and 88 located in the dogs.

The dogs 85 and 86 pivot with the shaft 81 about the shaft axis between an operating position in locking engagement with the respective axle plates 46 and 47 and a released position which permits the tray 40 to pivot freely from the horizontal position to the downwardly-tilted carton-transfer position in response to the weight of the carton 10. The locking position of the dogs 85 and 86 is selectively controlled by adjustable setscrews 89 located in the rearward ends of the dogs and which come into limiting engagement with the respective mounting bar 27, 28 as best shown in FIG. 4. A torsion spring 82 located on the shaft 81 urges the dogs 85 and 86 to their locking position.

According to one aspect of the tower operation it is necessary that each loaded tray 40 be held in its horizontal storage position so long as the next lower shelf assembly 30 mounted on the opposite tower section is also loaded with a carton 10. Whenever the next lower shelf assembly 30 is unloaded by transferring its respective carton 10 to another tray the higher shelf assembly 30 must operate to transfer its carton to the next lower shelf assembly as soon as the empty tray reaches its upwardly-tilted carton-receiving position. In order to accomplish this, the stop mechanism 80 must be released.

Figure 7:
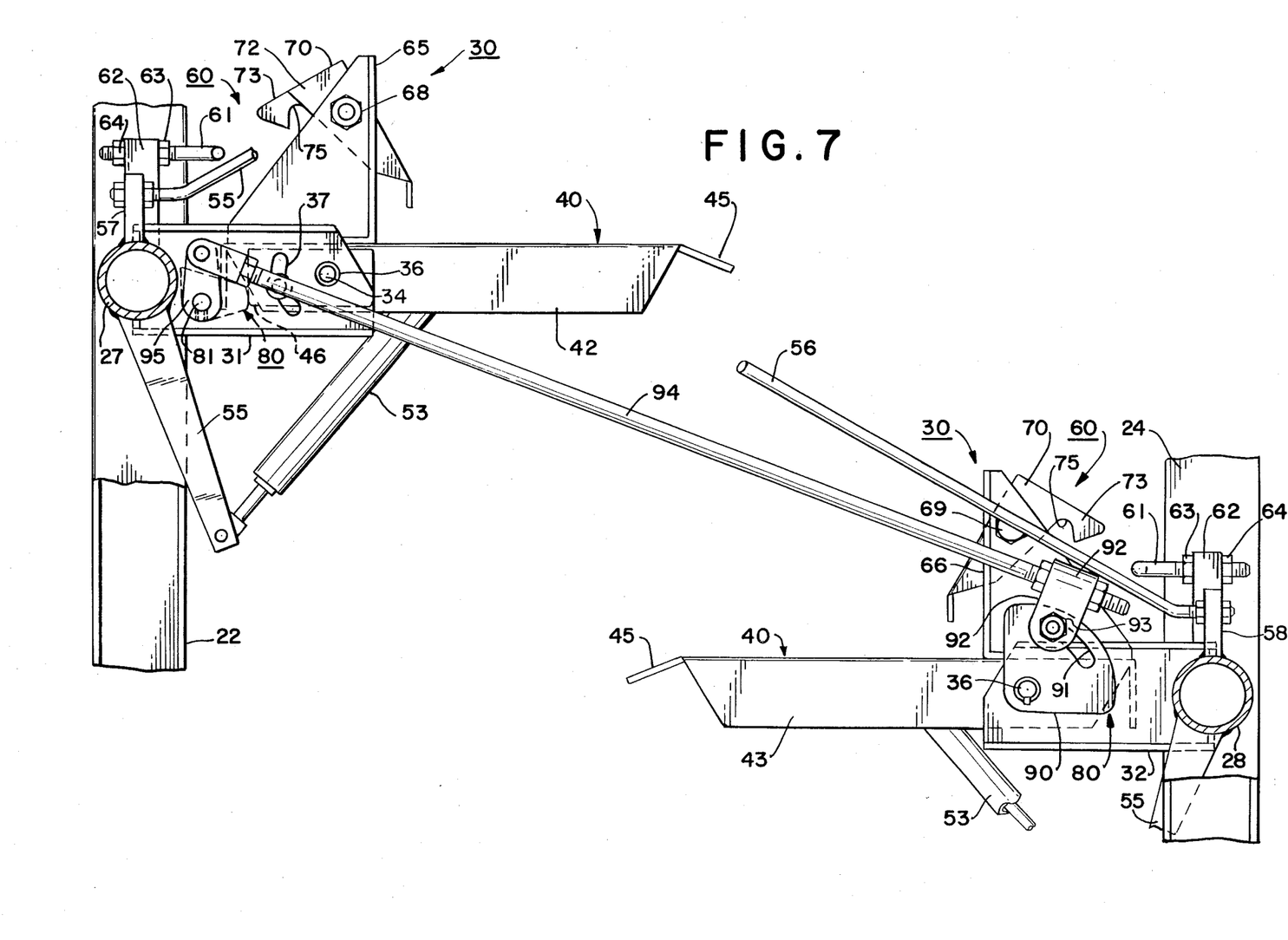
FIG. 7 is a fragmentary elevational view illustrating a portion of the carton storage and dispensing tower illustrated in FIGS. 1 and 2.

This release is accomplished by a mechanism best shown in FIG. 7, that includes an axle cam plate 90 keyed to an end of the axle shaft 36. The respective end of the axle shaft 36 extends outwardly beyond the respective mounting bracket sufficiently to permit the cam plate 90 to be mounted thereon. The cam plate has an arcuate slot 91 formed therein with its center of arc coinciding with the axis of the shaft 36. A toggle 92 cooperates with the cam plate 90 by means of its toggle pin 93 that extends through the slot 91.

During movement of the shaft 36 as the tray 40 moves between its horizontal position and its downwardly-extending carton-transfer position, the toggle pin 93 moves freely through the slot. However, when the shaft 36 moves in a direction to bring the respective tray 40 to the upwardly-tilted carton-receiving position, the toggle pin 93 engages the end of the slot 91 so that the toggle 92 is moved through an arc by the cam plate 90 and shaft 36.

The toggle 92 is mounted on one end of a connector rod 94 that extends therefrom to the next higher shelf assembly 30. The opposite end of the rod 94 is pivotally connected to an end of a crank arm 95. The opposite end of the crank arm 95 is keyed to an end of the respective shaft 81.

Accordingly when the connector rod 94 is actuated by the respective cam plate 90, it pivots the shaft 81 of the next higher shelf assembly 30 such that the shaft 81 pivots the respective stops 85 and 86 against the pressure of the torsion spring 82, and out of their engaged position. Thus, the tray 40 pivots downwardly under the weight of the carton 10 to its carton transfer position whereupon the carton 10 supported thereby slides downwardly to the tray 40 of the next lower shelf assembly.

Operation

The operation of the picking tower 20 thus constructed will be described with reference to a condition where the tower is approximately half loaded with cartons 10. Accordingly there will be room for additional cartons at the top. In this condition, about half of the shelf assemblies 30 will be supporting cartons 10 and will have their respective trays 40 in their horizontal positions. This will include the lowest shelf assembly.

All of the unloaded shelf assemblies will be moved by their respective torsion springs 50 to their upwardly-tilted carton-receiving positions.

At this point it will be assumed that a new carton 10 is delivered to the top of the picking tower 20. As that carton is delivered to the fixed slide 29, it slides along the slide to the tray 40 of the highest shelf asssembly 30, which is, of course, tilted to its upwardly tilted carton receiving position. As the carton 10 slides onto the tray 40 of the shelf assembly, it actuates the latch mechanism 60 to unlatch the tray 40 and permit it to move downwardly.

In this case the tray 40 will not be stopped at its horizontal storage position because the next lower shelf assembly, being tilted upwardly, has caused the respective stop mechanism 80 to be in a released condition. Accordingly, the highest shelf assembly 30 will tilt downwardly through the horizontal position to its downwardly-tilted carton-transfer position. When it reaches this position the carton 10 will slide from the respective tray 40 onto the next lower tray.

The transfer process will be continued until the carton reaches the lowest, previously empty shelf assembly 30. It will be retained on the tray 40 of that assembly which will be retained in a horizontal position because the next lower assembly is in its horizontal carton storage position and the respective dogs 85 and 86 will be engaged. This process will be repeated for each new carton 40 that is provided at the top of the picking tower.

The next portion of the picking tower operation will be described with respect to the unloading of a carton 10 from the bottom of the tower and thus from the lowest shelf assembly 30 on which a carton is stored.

The lowest shelf assembly 30 is somewhat unique with respect to the other shelf assemblies in that the stop mechanism does not have an associated stop release mechanism but rather an electrically operated device such as a solenoid 99 to operate the respective crank arm 95 connected to the shaft 81. The signal to actuate the solenoid 99 is provided, for example, from a centralized control system.

When the system determines that one of the cartons 10 is required at the distribution dock it sends a signal to the solenoid 99 to release the stop mechanism 80 of the lowest shelf assembly 30 so that the respective tray 40 pivots downwardly to its carton-transfer position. This permits the carton 10 to slide off the tray onto a conveyor.

Once the tray 40 is emptied, its respective torsion spring 50 will pivot it upwardly to its upwardly-tilted carton-receiving position. At the same time the stop release mechanism of the next higher shelf assembly will be actuated through the connector rod 94 to release the respective stop mechanism 80 and permit the next higher shelf assembly tray to pivot downwardly under the weight of its carton, to its downwardly-tilted carton-transfer position. Accordingly the carton 10 supported thereon will slide onto the tray 40 of the lowest shelf assembly 30 which will pivot downwardly to its horizontal carton-storage position.

When this is accomplished the torsion spring 50 for the next highest shelf assembly 30 will tilt the respective tray 40 upwardly to a carton-receiving position. Then the carton transfer process will be repeated seriatim from the bottom on up the tower until each carton 10 has progressed downwardly to the next lower shelf assembly.

It will be noted that the transfer process occurs automatically in a "trickle down" fashion in response to the force of gravity. No external power mechanism is used in accomplishing the downward progression or feed of the cartons.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A vertically accumulating storage and dispensing apparatus for containers and the like comprising:

a frame defining a first tower section and a second tower section;

a column of vertically spaced shelf trays supported by each tower section, each cloumn being adapted to support a stack of containers to be stored and dispensed, the shelf trays of each column facing inwardly from the respective tower section toward the shelf trays of the other column and being staggered vertically relative thereto, all of said shelf trays being mounted to their respective tower section for pivotal movement between an upwarly tilted receiving position, an intermediate storage position and a downwardly tilted transfer position, whereby said containers are supported individually spaced apart from and free of contact with one another by said shelf trays in their respective storage positions;

means urging each shelf tray to said receiving position when unloaded;

means for latching eaching shelf tray in said receiving position and for releasing said shelf tray from said receiving position upon receiving a container being transferred thereto;

releasable stop means each shelf tray, each stop means being mounted to the frame and being engageable with the respective shelf tray for retaining the shelf tray in its storage position when supporting a container; and link means operatively connected between the stop means for each shelf tray and the next lower shelf tray of the opposite tower section for releasing said shelf tray from said storage position when the next lower shelf tray of the opposite tower section is empty and tilted upward by said urging means to said receiving position, whereupon the container on the released shelf tray slides directly from said released shelf tray onto the next lower shelf tray.

2. Apparatus as defined in claim 1, wherein said means urging each shelf tray to said upwardly-tilted receiving position comprises a resilient spring means.

3. Apparatus as defined in claim 2, wherein said resilient means comprises a torsion spring.

4. Apparatus as defined in claim 1 wherein said means for latching and releasing said shelf tray respectively in and from its receiving position comprises:
   a fixed catch secured to said frame;
   a pivotable latch mounted on the top portion of said shelf tray for movement between a catch engaging position and a disengaged position; and
   resilient means urging said catch to said catch engaging position whereby when said tray is tilted upward to its receiving position, said latch engages said catch to hold said shelf tray in said receiving position until said latch is released.

5. Apparatus as defined in claim 4, wherein said latch is engageable by a container during sliding transfer movement of said container into said upwardly tilted shelf tray, to pivot said latch to its disengaged position.

6. Apparatus as defined in claim 1, wherein said releasable stop means comprises at least one dog movable between a stop position wherein it engages and checks said shelf tray in its storage position and a released position disengaged from said shelf tray, and means biasing said dog to its stop position.

7. A vertically accumulating storage and dispensing apparatus for containers and the like including a loading station and an unloading station and comprising:
   a tower frame defining interconnected first and second tower sections, whereby said containers to be stored in said apparatus are adapted to move downward in zig-zag fashion alternately supported by said tower sections;
   at least one upper shelf tray supported by said first tower section for pivotal movement about a first horizontal axis;
   at least one lower shelf tray staggered vertically relative to said upper shelf tray and supported by said second tower section for pivotal movement about a second horizontal axis vertically spaced from and parallel to said first horizontal axis;
   each of said shelf trays being pivotable about its respective axis between an upwardly tilted, receiving position, a generally horizontal storage position and a downwardly tilted transfering position, whereby said containers are supported individually, spaced apart from and free of contact with one another, only by said shelf trays in their respective storage positions;
   resilient means urging said shelf trays to said receiving position when unloaded;
   releasable latch means for retaining said shelf trays in said receiving position while receiving an article;
   releasable stop means for each shelf tray, each stop means being mounted to the frame and being engageable with the respective shelf tray for retaining said shelf trays in said storage position when supporting a container;
   link means operatively connected between the stop means for each shelf tray and the next lower shelf tray of the opposite tower section for releasing said releasable stop means in the next higher shelf tray in the other tower section whereby said next higher shelf tray tilts downward from its storage position to its transfer position and into angular alignment with said upwardly tilted shelf tray so that a container supported by said next higher shelf tray slides downwardly onto said upwardly tilted shelf tray; and
   means operable by a container moving onto an upwardly tilted shelf tray for releasing said latch means whereby said upwardly tilted shelf tray pivots downwardly to its horizontal storage position.

8. Apparatus as defined in claim 7, wherein said resilient means comprises a torsion spring.

9. Apparatus as defined in claim 7, wherein said releasable latch means comprises:
   a fixed catch mounted on said frame;
   a pivotable latch mounted on said shelf tray and pivotable relative to said shelf tray between a catch engaging position and a disengaged position; and
   resilient means urging said latch to its catch engaging position whereby when said shelf tray is pivoted to its receiving position, said latch engages said catch to retain said shelf tray in said receiving position until said latch is released.

10. Apparatus as defined in claim 9, wherein said latch is adapted to be moved to its disengaged position in response to sliding transfer movement of a container onto the respective upwardly tilted shelf tray.

11. Apparatus as defined in claim 7, wherein said releasable stop means comprises:
    dog means mounted on said frame and pivotable between a shelf tray engaging position to check said shelf tray in its horizontal storage position, and a released position; and
    means urging said dog means to said released position.

12. Apparatus as defined in claim 11, including connecting means for moving said dog means to said released position in response to pivotal movement of the next lower shelf tray of the opposite tower section upward to its receiving position.

13. Apparatus as defined in claim 12, wherein said connecting means comprises a crank arm operatively connected to said dog means, link means operatively connected to the shelf tray of the next lower shelf tray of the opposite tower section and means connecting said crank arm and link means to each other.

14. A vertically accumulating storage and dispensing apparatus for containers and the like including a loading station and an unloading station and comprising:
    a tower frame defining interconnected first and second tower sections, whereby said containers to be stored in said apparatus are adapted to move downward in zig-zag fashion alternately supported by said tower sections;
    at least one upper shelf tray supported by said first tower section for pivotal movement about a first horizontal axis;
    at least one lower shelf tray staggered vertically relative to said upper shelf tray and supported by said second tower section for pivotal movement about a second horizontal axis vertically spaced from and parallel to said first horizontal axis;
    each of said shelf trays being pivotable about its respective axis between an upwardly tilted, receiving position, a generally horizontal storage position and a downwardly tilted transfering position;
    resilient means urging said shelf trays to said receiving position when unloaded;
    releasable latch means for retaining said shelf trays in said receiving position while receiving an article;

dog means for each shelf tray mounted on said frame and pivotable between a shelf tray engaging position to check and retain said shelf tray in its horizontal storage position, and a released position;

means urging said dog means to said released position;

link means operatively connected between said dog means and the next lower shelf tray of the opposite tower section for moving said dog means to said released position in response to pivotal movement of the next lower shelf tray of the opposite tower section upward to its receiving position whereby said next higher shelf tray tilts downward from its storage position to its transfer position and into angular alignment with said upwardly tilted shelf tray whereby a container supported by said next higher shelf tray slides downwardly onto said upwardly tilted shelf tray; and means operable by a container moving onto an upwardly tilted shelf tray for releasing said latch means whereby said upwardly tilted shelf tray pivots downwardly to its horizontal storage position.

* * * * *